United States Patent
Kim et al.

(10) Patent No.: US 11,372,104 B2
(45) Date of Patent: Jun. 28, 2022

(54) OPTICAL SENSING SYSTEM AND OPTICAL APPARATUS INCLUDING THE SAME

(71) Applicant: SAMSUNG ELECTRONICS CO., LTD., Suwon-si (KR)

(72) Inventors: Sunil Kim, Osan-si (KR); Byounglyong Choi, Seoul (KR); Changgyun Shin, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 671 days.

(21) Appl. No.: 16/135,874

(22) Filed: Sep. 19, 2018

(65) Prior Publication Data

US 2019/0094359 A1 Mar. 28, 2019

(30) Foreign Application Priority Data

Sep. 25, 2017 (KR) .................. 10-2017-0123650

(51) Int. Cl.
*G01S 17/04* (2020.01)
*G01S 17/89* (2020.01)
(Continued)

(52) U.S. Cl.
CPC ............ *G01S 17/04* (2020.01); *G01S 7/4814* (2013.01); *G01S 7/4816* (2013.01); *G01S 17/42* (2013.01);
(Continued)

(58) Field of Classification Search
CPC .......... G01S 17/89; G01S 17/42; G01S 17/10; G01S 7/4811; G01S 17/04; G01S 7/4814; G01S 17/93; G01C 3/08
See application file for complete search history.

(56) References Cited

U.S. PATENT DOCUMENTS

| | | | |
|---|---|---|---|
| 2006/0119928 A1* | 6/2006 | Cicchiello | ............... G02F 1/292 359/322 |
| 2008/0043319 A1* | 2/2008 | Uchikawa | ............... G02F 1/055 359/315 |

(Continued)

FOREIGN PATENT DOCUMENTS

| | | |
|---|---|---|
| JP | 11-230915 A | 8/1999 |
| JP | 2010-107212 A | 5/2010 |

(Continued)

OTHER PUBLICATIONS

Communication dated May 11, 2020 by the European Patent Office in counterpart European Patent Application No. 18192816.9.

(Continued)

*Primary Examiner* — Luke D Ratcliffe
(74) *Attorney, Agent, or Firm* — Sughrue Mion, PLLC

(57) ABSTRACT

Provided are an optical sensing system and an optical apparatus including the same. The optical sensing system may include a light output part configured to emit a laser beam to an object, and a sensing part configured to sense a laser beam emitted from the light output part and reflected from the object. The sensing part may include a photodetector and the active optical device located on an optical path between the photodetector and the object. The active optical device may actively control an orientation of a laser beam passing therethrough and may include a material layer having a refractive index which is changeable by application of an electrical signal.

19 Claims, 11 Drawing Sheets

(51) Int. Cl.

| | | |
|---|---|---|
| *G02F 1/29* | (2006.01) | |
| *G01S 7/481* | (2006.01) | |
| *G02B 27/00* | (2006.01) | |
| *G01S 17/42* | (2006.01) | |
| *G01S 17/93* | (2020.01) | |
| *G06T 7/521* | (2017.01) | |
| *G02B 27/09* | (2006.01) | |

(52) U.S. Cl.
CPC .............. *G01S 17/89* (2013.01); *G01S 17/93* (2013.01); *G02B 27/0087* (2013.01); *G02B 27/0955* (2013.01); *G02F 1/292* (2013.01); *G06T 7/521* (2017.01)

(56) References Cited

U.S. PATENT DOCUMENTS

| | | | |
|---|---|---|---|
| 2008/0112042 A1* | 5/2008 | Nojima | G02F 1/29 |
| | | | 359/315 |
| 2010/0182671 A1 | 7/2010 | Park | |
| 2013/0242400 A1 | 9/2013 | Chen | |
| 2016/0266242 A1 | 9/2016 | Gilliland et al. | |
| 2017/0184450 A1 | 6/2017 | Doylend et al. | |
| 2017/0192270 A1 | 7/2017 | Lv et al. | |
| 2017/0214839 A1* | 7/2017 | Keller | H04N 5/2256 |
| 2017/0269215 A1* | 9/2017 | Hall | G01S 17/89 |

FOREIGN PATENT DOCUMENTS

| | | |
|---|---|---|
| JP | 2017-116525 A | 6/2017 |
| KR | 10-2010-0084842 A | 7/2010 |
| KR | 10-2014-0011810 A | 1/2014 |
| KR | 10-2016-0113794 A | 10/2016 |
| KR | 10-2017-0069752 A | 6/2017 |

OTHER PUBLICATIONS

Communication dated Jan. 30, 2019, issued by the European Patent Office in counterpart European Application No. 18192816.9.

Communication dated Nov. 26, 2021 issued by the Korean Intellectual Property Office in counterpart Korean Application No. 10-2017-0123650.

* cited by examiner

OPTICAL SENSING SYSTEM AND OPTICAL APPARATUS INCLUDING THE SAME

CROSS-REFERENCE TO RELATED APPLICATION

This application claims priority from Korean Patent Application No. 10-2017-0123650, filed on Sep. 25, 2017, in the Korean Intellectual Property Office, the disclosure of which is incorporated herein in its entirety by reference.

BACKGROUND

1. Field

Systems and apparatuses consistent with exemplary embodiments relate to an optical system and apparatus, and more particularly, to an optical sensing system and an optical apparatus including the same.

2. Description of the Related Art

Much attention has been paid to technologies for measuring a distance to or an orientation of an object, identifying an object or the geography of an area, or sensing a speed, a temperature, or a distribution of matter by using light (a beam). Related to this, research has been conducted on a method of controlling an orientation of light (a beam) (i.e., steering light) output from a light source.

In the case of a sensing system using a laser and having a co-axial structure, a sensing distance is long, and manufacturing such a sensing system may be easy, but mechanical parts, such as a motor, are needed to steer the output laser beam. Thus, a co-axial sensing system is vulnerable to vibration and is expensive. In the case of a sensing system with a bi-axial structure, a mechanical steering part such as a motor is not needed and the cost of the whole system is comparatively lower. However, a bi-axial sensing system is disadvantageous in view of its small field of view (FOV), and low sensing efficiency, luminous efficiency, and measurement accuracy/precision.

SUMMARY

One or more exemplary embodiments may provide optical sensing systems having a large field of view (FOV) and high luminous efficiency.

One or more exemplary embodiments may provide optical sensing systems having high measurement accuracy and precision.

One or more exemplary embodiments may provide optical sensing systems including a sensing part having an active optical device.

One or more exemplary embodiments may provide optical apparatuses including the optical sensing systems.

Additional exemplary aspects and advantages will be set forth in part in the description which follows and, in part, will be apparent from the description, or may be learned by practice of the presented exemplary embodiments.

According to an aspect of an exemplary embodiment, an optical sensing system includes a light output part configured to emit a laser beam to an object, and a sensing part configured to sense a laser beam emitted from the light output part and reflected from the object. The sensing part includes a photodetector, and an active optical device being located on an optical path between the photodetector and the object. The active optical device is configured to actively control an orientation of a laser beam passing therethrough.

The active optical device may include a refractive-index change layer having a refractive index which is changeable by application of an electrical signal, and an electrode member electrically connected to the refractive-index change layer.

The refractive-index change layer may include an electro-optic material.

The refractive-index change layer may include, for example, at least one material selected from a group consisting of liquid crystal, potassium tantalate niobate (KTN), lead zirconate titanate (PZT), $LiNbO_3$, $LiTaO_3$ and $NbO_x$.

The electrode member may include a first electrode and a second electrode spaced apart from each other with the refractive-index change layer disposed therebetween.

The first and second electrodes may be in contact with opposite ends of the refractive-index change layer, the opposite ends being spaced apart in a direction parallel to an incident surface of the refractive-index change layer.

The first and second electrodes may be in contact with two surfaces of the refractive-index change layer, the two surfaces being spaced apart in a direction perpendicular to an incident surface of the refractive-index change layer.

One of the first and second electrodes may be provided at an incident surface of the refractive-index change layer, and the other first or second electrode may be provided at an emission surface of the refractive-index change layer.

At least one of the first and second electrodes may include an array of a plurality of electrode elements.

The refractive-index change layer may include a plurality of unit regions. The electrode member may include a plurality of electrode elements corresponding to the plurality of unit regions.

The active optical device may include a plurality of unit regions. The optical sensing system may be configured to individually control an optical characteristic of each of the plurality of unit regions.

The active optical device may be greater in size than the photodetector.

The active optical device may have a size which is 1.5 times or more than that of the photodetector.

The optical sensing system may further include a lens system having positive (+) refractive power disposed on an optical path between the active optical device and the object.

The light output part may include a beam steering device configured to steer a laser beam.

The light output part may be configured to simultaneously emit a plurality of laser beams.

The optical sensing system may include a plurality of active optical devices.

The plurality of active optical devices may be sequentially arranged on an optical path between the photodetector and the object.

The plurality of active optical devices may be in contact with each other or be spaced apart from each other.

The plurality of active optical devices may include a first active optical device and a second active optical device. The first active optical device may include a first active layer. The second active optical device may include a second active layer. The first active layer and the second active layer may include the same material or different materials.

The optical sensing system may have a bi-axial structure.

According to an aspect of another exemplary embodiment, an optical apparatus includes the optical sensing system described above. The optical apparatus may include, for example, at least one among a light detection and ranging (LiDAR) device a three-dimensional (3D) image acquiring device, a 3D sensor, and a depth sensor.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
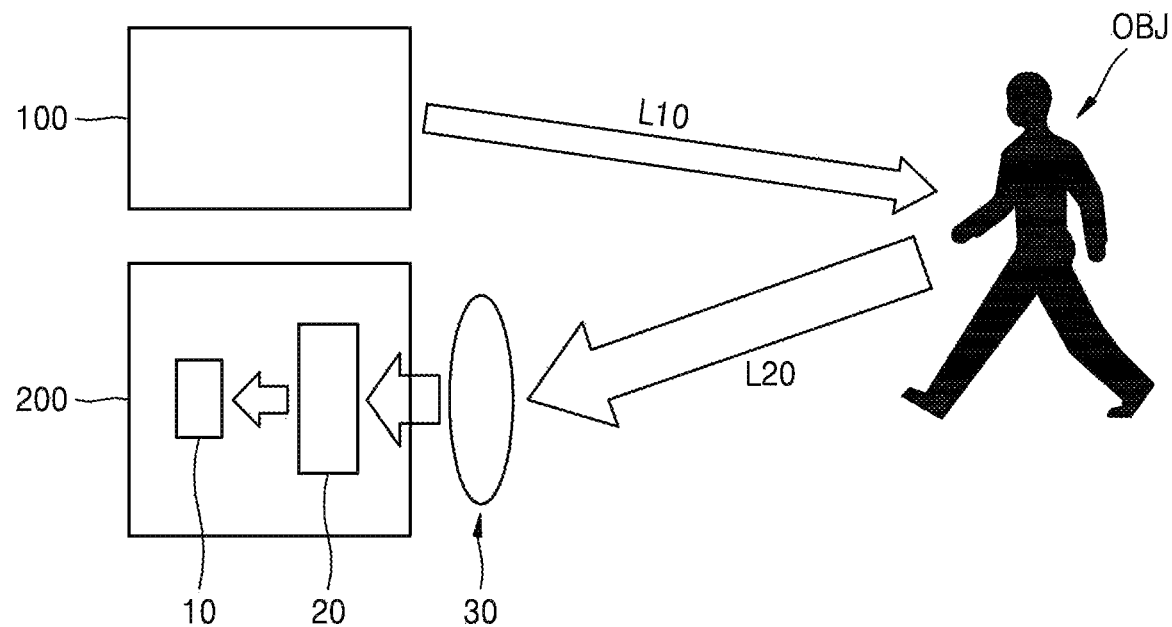
FIG. 1 is a conceptual diagram schematically illustrating an optical sensing system according to an exemplary embodiment.

Various exemplary embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used herein, expressions such as "at least one of," when preceding a list of elements, modify the entire list of elements and do not modify the individual elements of the list.

Hereinafter, an optical sensing system and an optical apparatus including the same according to embodiments will be described in detail with reference to the accompanying drawings. In the drawings, a width and thickness of each layer or region may be exaggerated for clarity and convenience of explanation. Throughout the present disclosure, the same reference numerals represent the same elements.

FIG. 1 is a conceptual diagram schematically illustrating an optical sensing system according to an exemplary embodiment.

Referring to FIG. 1, the optical sensing system according to an exemplary embodiment may include a light output part 100 configured to emit a laser beam L10 to an object OBJ, and a sensing part 200 configured to sense a laser beam L20 emitted from the light output part 100 and reflected from the object OBJ.

The sensing part 200 may include a photodetector 10 and an active optical device 20. The active optical device 20 may be located on an optical path between the photodetector 10 and the object OBJ. The active optical device 20 may be configured to actively control an orientation of a laser beam passing therethrough. For example, the active optical device 20 may be configured to control an orientation of a laser beam by using an electrical signal. An orientation of the laser beam L20 reflected from the object OBJ may be controlled by the active optical device 20 such that the laser beam L10 is made incident on the photodetector 10.

A lens system 30 having positive (+) refractive power may be further provided on an optical path between the active optical device 20 and the object OBJ. Although the lens system 30 is illustrated as a convex lens in FIG. 1, the convex lens is merely an example and the lens system 30 may be differently configured. The lens system 30 may include a general optical lens. The optical lens may be a condensing lens (a convergent lens). The lens system 30 may be considered as being included in the sensing part 200.

The optical sensing system according to the present exemplary embodiment may have a bi-axial structure. Accordingly, the laser beam L10 emitted from the light output part 100 and the laser beam L20 reflected from the object OBJ proceed along different optical axes. In this case, the light output part 100 may include a non-mechanical beam steering device. In other words, the light output part 100 may be configured to steer a beam via a non-mechanical method without using a mechanical steering part such as a motor. When a non-mechanical method is employed, problems caused by vibration or noise do not occur, a system size (volume) may be reduced and a measurement accuracy may be improved. When the bi-axial structure is employed, objects or portions of the object at various locations may be sensed by a single sensing part 200. Accordingly, even if a plurality of light output parts 100 are provided, only one sensing part 200 may be used, and thus, the cost of the whole system may be comparatively lowered.

When a co-axial structure is employed, unlike the use of a bi-axial structure, a mechanical part such as a motor is required to steer a beam, and thus, the system may be vulnerable to vibration and the cost thereof may be comparatively high. Furthermore, since a light output part and a sensing part should be located on the same path in a co-axial structure, the number of sensing parts should be increased when the number of light output parts is increased. Since a plurality of light output parts and a plurality of sensing parts corresponding to locations to be sensed are required in a direction in which a mechanical rotation is not permitted, the cost of the whole system may be comparatively very high. In contrast, when a bi-axial structure is used as in the present exemplary embodiment, the disadvantages of the co-axial structure may be overcome. However, optical sensing systems according to exemplary embodiments are not limited to the bi-axial structure and various modifications may be made therein.

Figure 2:
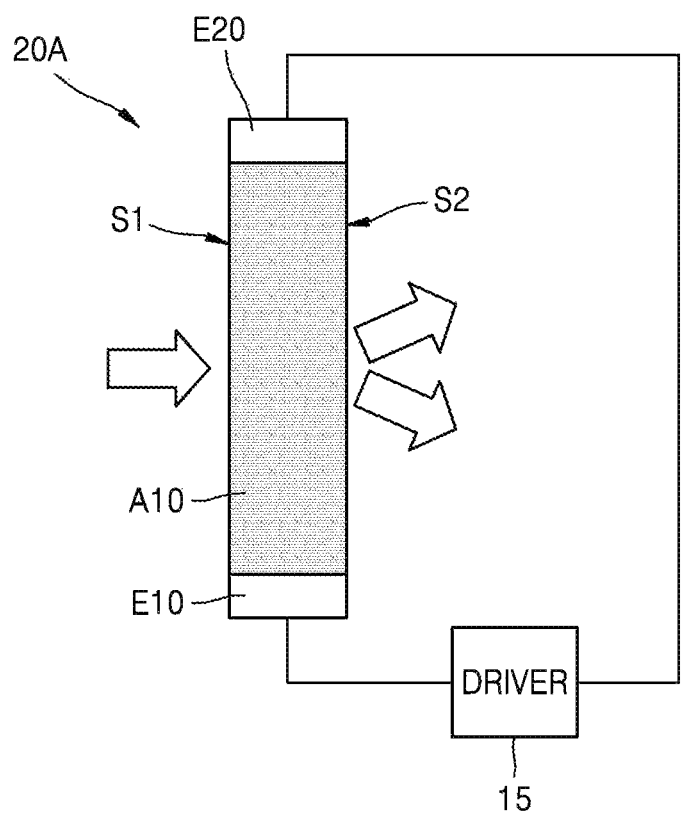
FIG. 2 is a cross-sectional view of an active optical device of an optical sensing system according to an exemplary embodiment.

FIG. 2 is a cross-sectional view of an active optical device 20A of an optical sensing system according to an exemplary embodiment.

Referring to FIG. 2, the active optical device 20A may include an active layer (hereinafter referred to as "a refractive-index change layer") A10, having an optical feature, such as a refractive index, which is variable based on application of an electrical signal, and an electrode member electrically connected to the refractive-index change layer A10. The electrode member is configured to supply an electrical signal to the refractive-index change layer A10, and may include a first electrode E10 and a second electrode E20 spaced apart from each other with the refractive-index change layer A10 disposed therebetween.

The refractive-index change layer A10 may include an electro-optic (EO) material. For example, the EO material of the refractive-index change layer A10 may include at least one material selected from among liquid crystal, potassium tantalate niobate (KTN), lead zirconate titanate (PZT), $LiNbO_3$, $LiTaO_3$ and $NbO_x$. The refractive-index change layer A10 may include any of various types of polymers having EO characteristics. However, a material of the refractive-index change layer A10 is not limited thereto. The refractive-index change layer A10 may include a transparent conductive oxide having a physical property which is variable based on an electrical condition thereof or including a transition metal nitride.

The first and second electrodes E10 and E20 of the active optical device 20A according to the present exemplary embodiment may be in contact with opposite ends of the refractive-index change layer A10 in a direction parallel to an incident surface S1 of the refractive-index change layer A10. Reference numeral S2 represents an emission surface of the refractive-index change layer A10.

The active optical device 20A may also include a driver 15 connected to the first electrode E10 and the second electrode E20. An electrical signal may be supplied to the refractive-index change layer A10 by the driver 15 via the two electrodes E10 and E20, and a physical property (e.g., a refractive index) of the refractive-index change layer A10 may be changed by application of the electrical signal. As the physical property of the refractive-index change layer A10 is changed, an orientation of light emitted from the active optical device 20A may likewise change.

Figure 3:
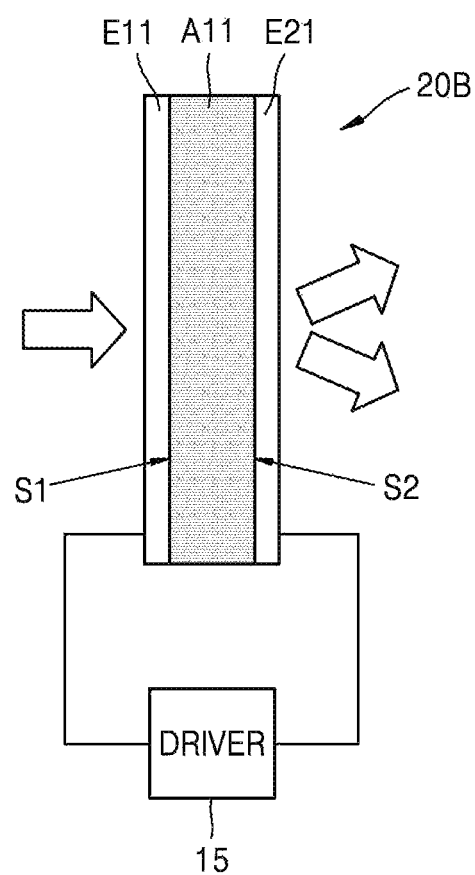
FIG. 3 is a cross-sectional view of an active optical device of an optical sensing system according to another exemplary embodiment.

FIG. 3 is a cross-sectional view of an active optical device 20B of an optical sensing system according to another exemplary embodiment.

Referring to FIG. 3, the active optical device 20B may include a refractive-index change layer (an active layer) A11, and first and second electrodes E11 and E21 electrically connected to the refractive-index change layer A11. In the present exemplary embodiment, the first and second electrodes E11 and E21 may be in contact with opposite surfaces of the refractive-index change layer A11 in a direction perpendicular to an incident surface S1 of the refractive-index change layer A11. In other words, one of the first and second electrodes E11 and E21, e.g., the first electrode E11, may be provided at the incident surface S1 of the refractive-index change layer A11 and the other of the first and second electrodes E11 or E21, e.g., the second electrode E21, may be provided at an emission surface S2 of the refractive-index change layer A11. In this case, the first and second electrodes E11 and E21 may be each formed of a transparent conductive material. A driver 15 connected to the first and second electrodes E11 and E21 may be further provided. An electrical signal may be supplied to the refractive-index change layer A11 from the driver 15 via the two electrodes E11 and E21.

Each of the active optical devices 20A and 20B illustrated in FIGS. 2 and 3 may be utilized as a device which is capable of steering a beam (laser beam) by using an electrical signal in a sensing part. Each of the active optical devices 20A and 20B may be utilized as an active lens.

Figure 4:
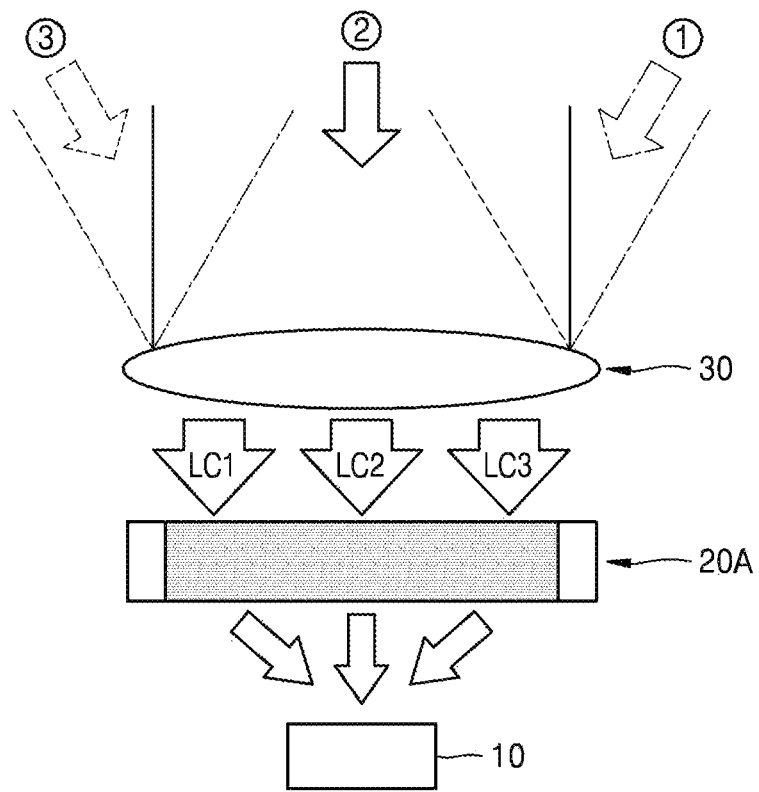
FIG. 4 is a diagram for explaining an optical sensing process/principle of an optical sensing system according to an exemplary embodiment.

FIG. 4 is a diagram for explaining an optical sensing process/principle employed in an optical sensing system according to an exemplary embodiment. FIG. 4 illustrates an optical path and a detection process of a sensing part, in conjunction with a whole structure of an optical sensing system such as that shown in FIG. 1. Thus, FIG. 4 will be described below with reference to the structure of the optical sensing system of FIG. 1.

Referring to FIG. 4, a laser beam emitted from the light output part 100 of FIG. 1 is reflected from the object OBJ of FIG. 1 and is then incident on the sensing part 200 of FIG. 1. In this case, the light output part 100 may output a laser beam by steering it into a region to be sensed, i.e., a field of view (FOV), or may emit a plurality of laser beams simultaneously into the FOV region. The laser beam or each of the plurality of laser beams may be a continuous beam or a pulsed beam. The simultaneous emission of the plurality of laser beams may be referred to as or defined as a light emission of a 'flash' form or a 'shot' form in the present description.

The laser beam reflected from the object OBJ and incident on the sensing part 200 reaches a different location on the sensing part 200 according to a location in the FOV region from which it is incident. For example, a laser beam incident on a location and direction indicated by ① may pass through a lens system 30 and reach a first region of an active optical device 20A, a laser beam incident on a location and direction indicated by ② may pass through the lens system 30 and reach a second region of the active optical device 20A, and a laser beam incident on a location and direction indicated by ③ may pass through the lens system 30 and reach a third region of the active optical device 20A. The first region may correspond to a 'location 1 (LC1)', the second region may correspond to a 'location 2 (LC2)', and the third region may correspond to a 'location 3 (LC3),' as shown in FIG. 4. The laser beams reaching different locations may be steered to a location on a photodetector 10 by using the active optical device 20A.

As described above, even if laser beams from different locations in the FOV region reach different locations on the sensing part 200, the laser beams may be directed to a specific (desired) region by using the active optical device 20A. Thus, a size of the photodetector 10 may be reduced greatly and laser beams from all locations in the FOV region may be sensed with the same luminous efficiency. In this way, manufacturing costs of an optical sensing system may be lowered, a sensing efficiency and a sensing distance may be increased, and the accuracy and precision of measurement may be improved, thereby reducing a measurement error (a distance error, etc.). Furthermore, since the active optical device 20A may be driven by an electric current, an operating speed and transmittance thereof are high and thus an optical loss may be low.

The photodetector 10 may include a sensing material such as silicon (Si) or a Group III-V semiconductor, and may have a single cell structure or a structure including a plurality of unit sensors (a sensor array). The photodetector 10 may have a small and compact size. In the present exemplary embodiment, the photodetector 10 may have a size (width) less than that of the active optical device 20A. For example, a size (width) of the active optical device 20A may be about 1.5 times or more than or may be about 2 times or more that of the photodetector 10. The photodetector 10 may be reduced in size and may be thus very advantageous in terms of a manufacturing process and costs.

In the above-described exemplary embodiments, the active optical devices 20, 20A, and 20B may each be divided into a plurality of unit regions, and optical characteristics of the plurality of unit regions may be individually controlled. In other words, the refractive-index change layers A10 and A11 may each be divided into a plurality of unit regions and refractive indexes of the plurality of unit regions may be individually controlled. To this end, at least one electrode from among the first electrodes E10 and E11 and the second electrodes E20 and E21 may include a plurality of electrode elements, and the plurality of electrode elements may be provided to correspond to the plurality of unit regions. A case in which an active optical device is divided into a plurality of unit regions will be described with reference to FIGS. 5 to 8 below.

Figure 5:
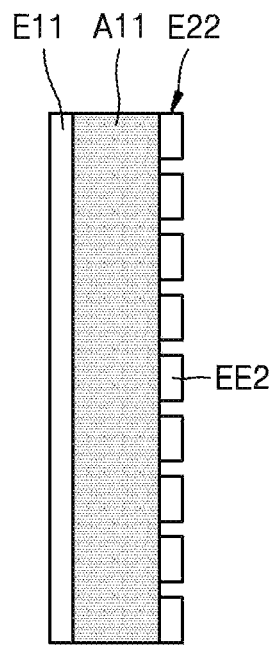
FIG. 5 is a cross-sectional view of an active optical device of an optical sensing system according to another exemplary embodiment.

FIG. 5 is a cross-sectional view of an active optical device of an optical sensing system according to another exemplary embodiment.

Referring to FIG. 5, a first electrode E11 is provided on one surface of a refractive-index change layer A11 and a second electrode E22 is provided on another surface thereof. The second electrode E22 may include a plurality of electrode elements EE2. The first electrode E11 may be a common electrode. The plurality of electrode elements EE2 of the second electrode E22 may be individually-controlled pixel electrodes. Characteristics of regions of the refractive-index change layer A11 corresponding to the plurality of electrode elements EE2 may be controlled according to an electrical signal (voltage) supplied to the plurality of electrode elements EE2.

Figure 6:
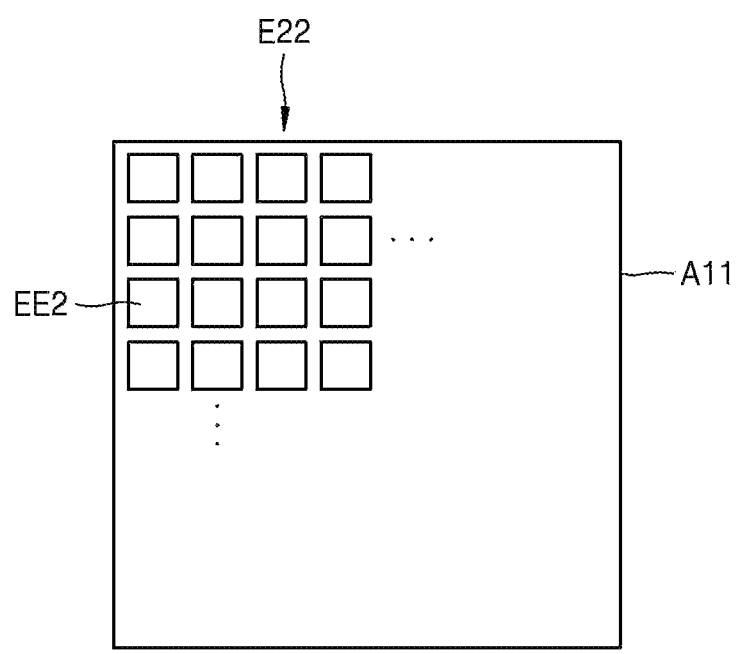
FIG. 6 is a plan view of a planar array of a plurality of electrode elements of FIG. 5.

FIG. 6 is a plan view of a planar array of the plurality of electrode elements EE2 of FIG. 5. As illustrated in FIG. 6, the plurality of electrode elements EE2 may be arranged in an array on one surface of the refractive-index change layer A11. In FIGS. 5 and 6, the number and arrangement of the electrode elements EE2 are merely examples and thus may be variously changed.

Figure 7:
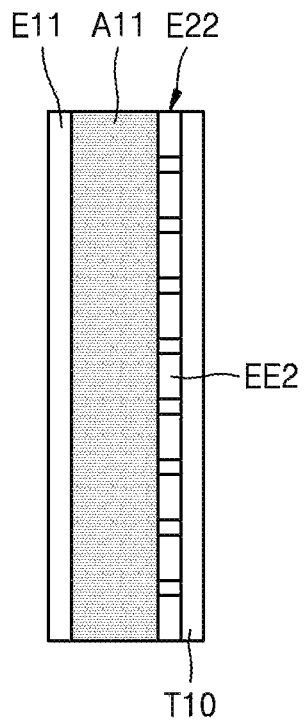
FIG. 7 is a cross-sectional view of an active optical device of an optical sensing system according to another exemplary embodiment.

FIG. 7 is a cross-sectional view of an active optical device of an optical sensing system according to another exemplary embodiment.

Referring to FIG. 7, a thin-film transistor (TFT) array substrate T10 bound to a side of a second electrode E22 may be further provided. The TFT array substrate T10 may include a plurality of TFTs (not shown). The plurality of TFTs may be respectively electrically connected to a plurality of electrode elements EE2. An electrical signal may be supplied to the plurality of electrode elements EE2 by the plurality of TFTs. In this case, a driver (not shown) may be connected between a first electrode E11 and the TFT array substrate T10.

Although FIGS. 5 to 7 illustrate that the second electrode E22 includes the plurality of electrode elements EE2, the first electrode E11 may include a plurality of electrode elements rather than the second electrode E22. Alternatively, each of the first electrode E11 and the second electrode E22 may be divided into a plurality of electrode elements as illustrated in FIG. 8.

Figure 8:
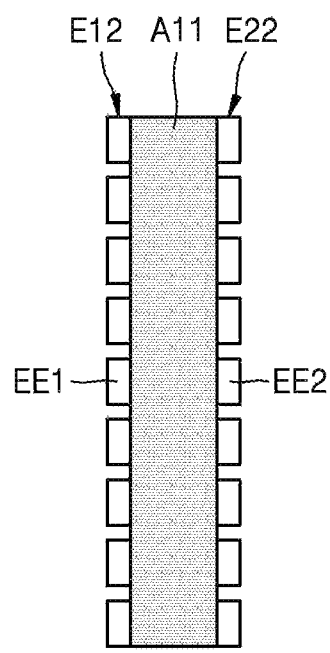
FIG. 8 is a cross-sectional view of an active optical device of an optical sensing system according to another exemplary embodiment.

FIG. 8 is a cross-sectional view of an active optical device of an optical sensing system according to another exemplary embodiment.

Referring to FIG. 8, a first electrode E12 including a plurality of first electrode elements EE1 may be provided on one surface of a refractive-index change layer A11, and a second electrode E22 including a plurality of second electrode elements EE2 may be provided on another surface of the refractive-index change layer A11. The plurality of first electrode elements EE1 and the plurality of second electrode elements EE2 may be in a 1:1 correspondence with each other.

Although not shown, a first TFT array device may be further provided at a side of the first electrode E12, and a second TFT array device may be further provided at a side of the second electrode E22. Each of the first and second TFT array devices may include a plurality of TFTs. In this case, a driver may be connected between the first TFT array device and the second TFT array device.

Similarly, in the active optical device 20A of FIG. 2, the refractive-index change layer A10 may be divided into a plurality of unit regions, at least one of the first electrode E10 and the second electrode E20 may be divided into a plurality of electrode elements, and the plurality of electrode elements may be, respectively, electrically connected to the plurality of unit regions to individually control the plurality of unit regions.

In another exemplary embodiment, a sensing part of an optical sensing system may include a plurality of active optical devices. In this case, the plurality of active optical devices may be sequentially arranged at a side of a photodetector and between the photodetector and an object. The plurality of active optical devices may be arranged to be in contact with each other or to be spaced apart from each other. When the plurality of active optical devices are used, a structure thereof may be as illustrated in one of FIGS. 9 to 14.

Figure 9:
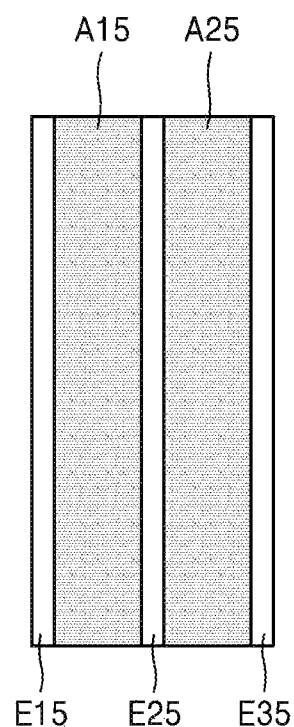
FIG. 9 is a cross-sectional view of an active optical device of an optical sensing system according to another exemplary embodiment.

Referring to FIG. 9, a first refractive-index change layer (a first active layer) A15 may be provided, and a second refractive-index change layer (a second active layer) A25 may be provided and may be spaced apart from the first refractive-index change layer (the first active layer) A15. The first refractive-index change layer A15 may be arranged between a first electrode E15 and a second electrode E25. The second refractive-index change layer A25 may be arranged between a second electrode E25 and a third electrode E35. The second electrode E25 may be a shared electrode, in common to the first refractive-index change layer A15 and the second refractive-index change layer A25. The first electrode E15, the second electrode E25, and the first refractive-index change layer A15, disposed between the first electrode E15 and the second electrode E25, may form a first active optical device. The second electrode E25, the third electrode E35, and the second refractive-index change layer A25, disposed between the second electrode E25 and the third electrode E35, may form a second active optical device. In this case, the first and second active optical devices may be bound to each other.

The first refractive-index change layer (first active layer) A15 and the second refractive-index change layer (second active layer) A25 may include the same material or different materials. For example, the first and second refractive-index change layers A15 and A25 may include the same electro-optic material or different electro-optic materials. The electro-optic material may be, for example, liquid crystal, potassium tantalate niobate (KTN), lead zirconate titanate (PZT), $LiNbO_3$, $LiTaO_3$, $NbO_x$, or the like.

Figure 10:
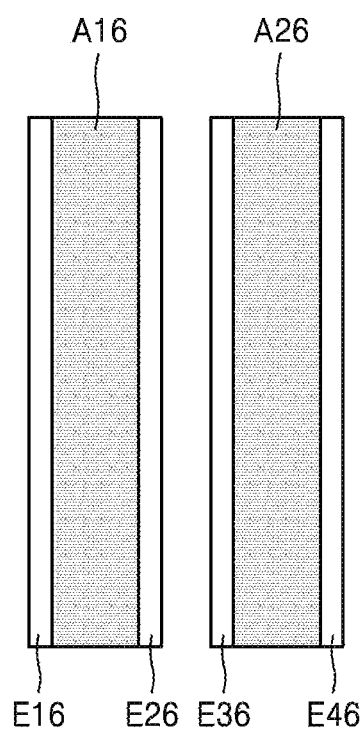
FIG. 10 is a cross-sectional view of an active optical device of an optical sensing system according to another exemplary embodiment.

Referring to FIG. 10, two active optical devices may be arranged and may be spaced apart from each other. A first electrode E16, a second electrode E26, and a first refractive-index change layer A16 between the first electrode E16 and the second electrode E26 may form a first active optical device. A third electrode E36, a fourth electrode E46, and a second refractive-index change layer A26 between the third electrode E36 and the fourth electrode E46 may form a second active optical device. The second electrode E26 and the third electrode E36 may be spaced apart from each other. Thus, the first and second active optical devices may be spaced apart from each other.

Figure 11:
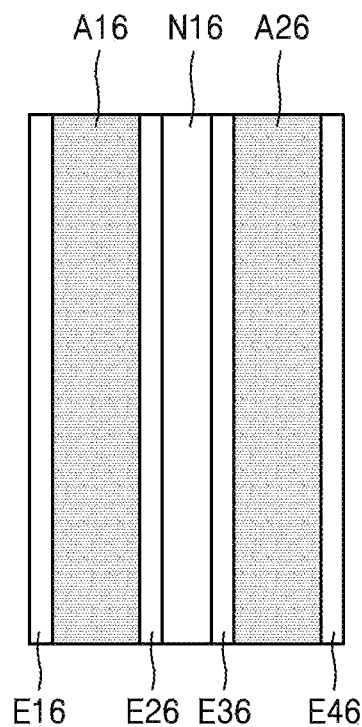
FIG. 11 is a cross-sectional view of an active optical device of an optical sensing system according to another exemplary embodiment.

In an exemplary embodiment of FIG. 10, an insertion layer may be further provided between the second electrode E26 and the third electrode E36 as illustrated in FIG. 11. Referring to FIG. 11, an insertion layer N16 may be provided between a second electrode E26 and a third electrode E36. The insertion layer N16 may be a transparent insulating layer.

Figure 12:
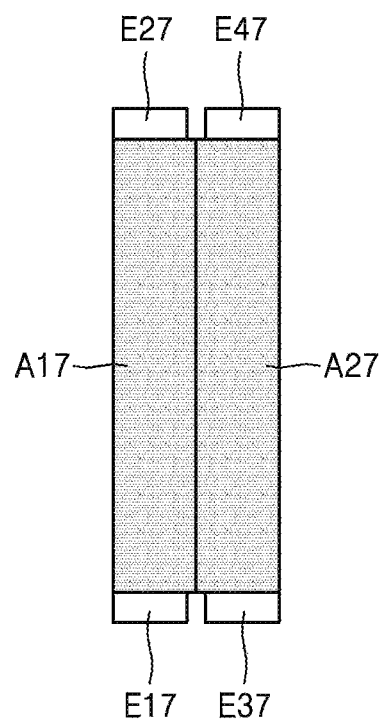
FIG. 12 is a cross-sectional view of an active optical device of an optical sensing system according to another exemplary embodiment.

FIG. 12 is a cross-sectional view of an active optical device of an optical sensing system according to another exemplary embodiment.

Referring to FIG. 12, a first refractive-index change layer (first active layer) A17 and a second refractive-index change layer (second active layer) A27 may be provided and may be in contact with each other. A first electrode E17 and a second electrode E27 may be provided at opposite sides (opposite ends) of the first refractive-index change layer A17 in a direction parallel to an incident surface of the first refractive-index change layer A17. Similarly, a third electrode E37 and a fourth electrode E47 may be provided at opposite sides (opposite ends) of the second refractive-index change layer A27 in a direction parallel to an incident surface of the second refractive-index change layer A27. The first electrode E11 and the third electrode E37 may be spaced apart from each other. The second electrode E27 and the fourth electrode E47 may be spaced apart from each other.

Figure 13:
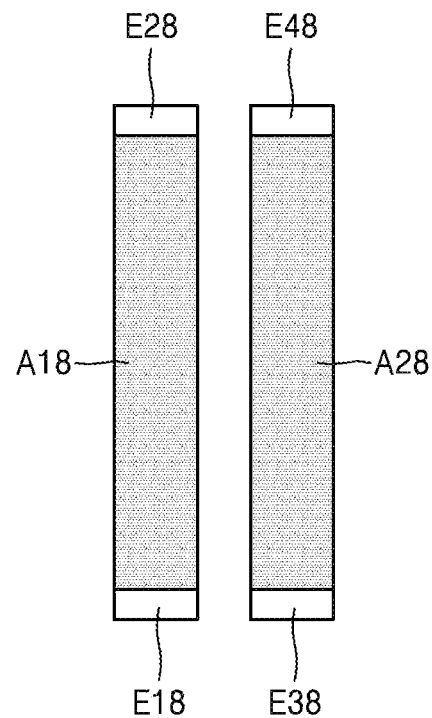
FIG. 13 is a cross-sectional view of an active optical device of an optical sensing system according to another exemplary embodiment.

Referring to FIG. 13, a first refractive-index change layer A18 and a second refractive-index change layer A28 may be arranged to be spaced apart from each other. A first electrode E18 and a second electrode E28 may be provided at opposite ends of the first refractive-index change layer A18. A third electrode E38 and a fourth electrode E48 may be provided at opposite ends of the second refractive-index change layer A28.

Figure 14:
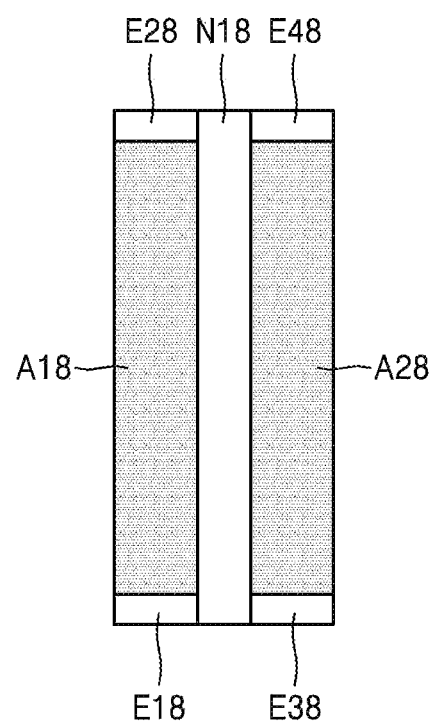
FIG. 14 is a cross-sectional view of an active optical device of an optical sensing system according to another exemplary embodiment.

An exemplary embodiment of FIG. 14 is substantially the same as that of FIG. 13, except that an insertion layer N18 may be further provided between a first refractive-index change layer A18 and a second refractive-index change layer A28. The insertion layer N18 may extend between a first electrode E18 and a third electrode E38 and between a second electrode E28 and a fourth electrode E48. The insertion layer N18 may be a transparent insulating layer.

Figure 15:
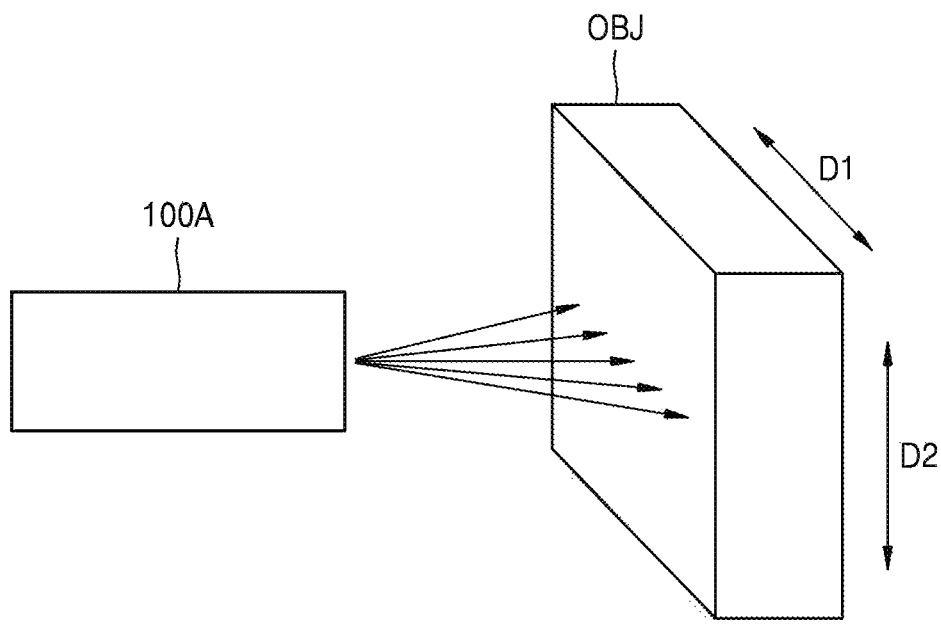
FIG. 15 is a conceptual diagram for explaining a light output part applicable for use with an optical sensing system according to an exemplary embodiment.

FIG. 15 is a conceptual diagram for explaining a light output part 100A applicable to an optical sensing system, according to an exemplary embodiment.

Referring to FIG. 15, the light output part 100A may include a beam steering device configured to steer a laser beam. The light output part 100A may be used to one-dimensionally or two-dimensionally steer a laser beam. Although a case in which a beam is steered toward an object OBJ in a first direction D1 is illustrated in FIG. 15, a beam may be steered in the first direction D1 and/or a second direction D2 perpendicular to the first direction D1.

The beam steering device of the light output part 100A may be configured to steer a beam according to a non-mechanical method. For example, the beam steering device may include an optical splitter, an optical modulator, and an emitter. The optical splitter is configured to split light generated from a light source and may be a type of beam splitter.

The optical modulator may modulate light split by the optical splitter. The optical modulator may modulate light in any of various ways. For example, the optical modulator may modulate a phase of the split light. Alternatively, the optical modulator may modulate an amplitude of the split light. Alternatively, the optical modulator may modulate both the phase and amplitude of the split light. In addition, an optical modulation function of the optical modulator may be variously changed. The optical modulator may perform optical modulation according to any of various methods such as an electrical method, a magnetic method, a thermal method, etc. As a concrete example, the optical modulator may include at least one phase shifter or phase shifting element. The phase shifter may include, for example, at least one element selected from a group consisting of a gain element, an all-pass filter, a Bragg grating, a dispersive material element, a wavelength tuning element, a phase tuning element, etc. An actuation mechanism applicable to the optical modulator may include, for example, at least one mechanism selected from the group consisting of a thermo-optic actuation mechanism, an electro-optic actuation exemplary, an electroabsorption actuation exemplary, a free carrier absorption actuation exemplary, a magneto-optic actuation exemplary, a liquid crystal actuation exemplary, an all-optical actuation exemplary, etc. The actuation mechanism may be related to the above-described phase tuning. However, the elements of the phase shifter and the actuation mechanism described above are merely examples and embodiments are not limited thereto. In addition, the optical modulator may be configured to modulate light using a surface plasmon resonance phenomenon. In this case, the optical modulator may include a plasmonic nano-antenna or an array thereof.

The emitter may receive light from the optical modulator and emit the light. At least a portion of the output light (a laser beam) may be steered in a desired direction while it is emitted. A direction in which a portion of output light (a laser beam) is to be steered may be controlled according to a method of modulating light of the optical modulator. A direction in which a portion of output light may be steered while the portion of output light is emitted or directions in which a plurality of portions of output light may be steered while the plurality of portions of output light are simultaneously emitted. The emitter may be referred to as a type of output coupler. For example, the emitter may include a plurality of waveguides. The emitter may further include a grating structure formed on the plurality of waveguides. The grating structure may be designed to emit light of a specific wavelength of light in a specific direction. However, a structure of the emitter is not limited thereto and may be variously changed.

At least one element from among the optical splitter, the optical modulator and the emitter may include at least one material from among a Group IV material (e.g., Si, Ge, or the like), a compound containing a group IV material (e.g., SiGe or the like), a Group III-V compound, an oxide, a nitride, and a polymer. In some cases, at least two elements from among the optical splitter, the optical modulator and the emitter may include different materials. The optical splitter and the optical modulator may be connected via a waveguide (or waveguides). The optical modulator and the emitter may be also connected via a waveguide (or waveguides).

The beam steering device may include a light source or may include an input part (an input coupler) to receive light generated from a separate light source. Thus, the light source may be included in the beam steering device or may be external to the beam steering device.

While beam steering devices have been described in detail above, exemplary embodiments of the present disclosure are not limited thereto and may be variously changed. In some cases, a device configured to steer a beam according to a mechanical method may be applied to the light output part 100A.

Figure 16:
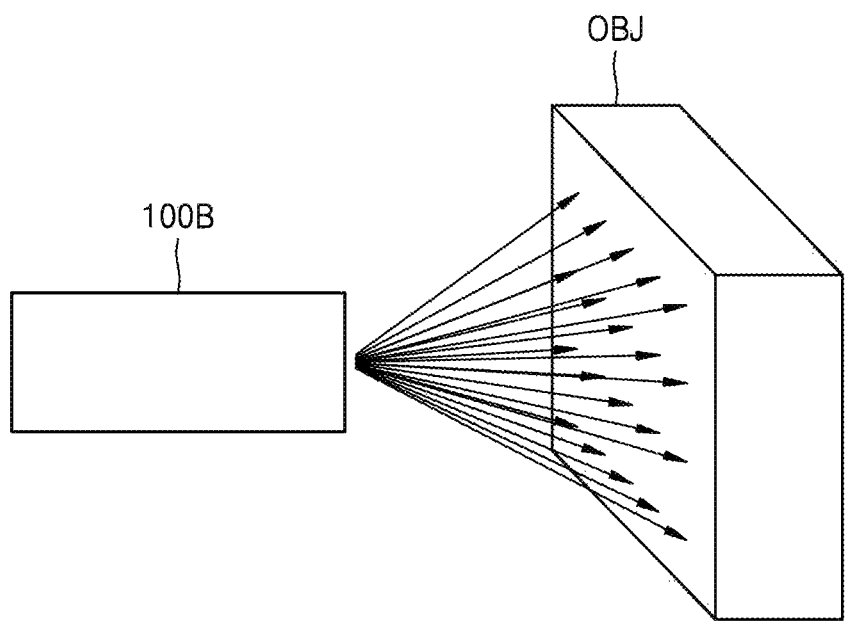
FIG. 16 is a conceptual diagram for explaining a light output part applicable for use with an optical sensing system, according to another exemplary embodiment.

FIG. 16 is a conceptual diagram for explaining a light output part 100B applicable to an optical sensing system, according to another exemplary embodiment.

Referring to FIG. 16, the light output part 100B may be configured to emit a plurality of beams toward an object OBJ. In other words, the light output part 100B may be configured to emit a plurality of beams. The light output part 100B may emit the plurality of beams simultaneously or at different times, and may output continuous beams or pulsed beams. In a case in which the plurality of laser beams are simultaneously emitted, a plurality of laser beams reflected from the object OBJ may be simultaneously incident on one sensing part.

Figure 17:
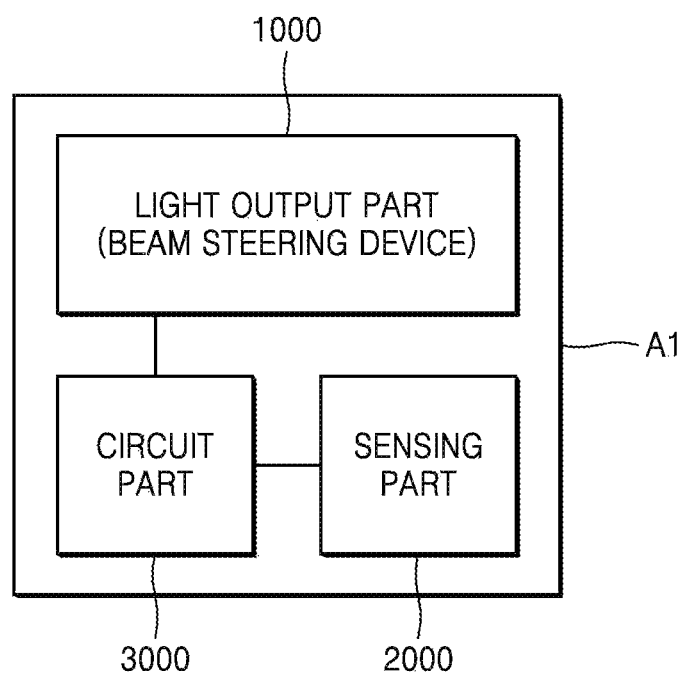
FIG. 17 is a block diagram of an optical apparatus including an optical sensing system according to an exemplary embodiment.

FIG. 17 is a block diagram of an optical apparatus A1 with an optical sensing system according to an exemplary embodiment.

Referring to FIG. 17, the optical apparatus A1 may include a light output part 1000 configured to emit a laser beam to an object, and a sensing part 2000 configured to sense a laser beam reflected from the object. The light output part 1000 may include, for example, a beam steering device. The light output part 1000 may alternately include a light output device that may emit a plurality of laser beams simultaneously with no steering function. Each of the plurality of laser beams may be a continuous beam or a pulsed beam. The simultaneous emission of the plurality of laser beams may be referred to as or defined as a light emission of a 'flash' form or a 'shot' form in the present description. The optical apparatus A1 may include a light source included in the light output part 1000 or a light source provided separately from the light output part 1000. The sensing part 2000 may include a photodetector and an active optical device. The active optical device may be as described above with reference to FIGS. 1 to 14. The sensing part 2000 may further include another optical member, as well as the photodetector and the active optical device. The optical apparatus A1 may further include a circuit part 3000 connected to at least one of the light output part 1000 and the sensing part 2000. The circuit part 3000 may include an operation part configured to obtain data and perform an operation thereof, and may further include a driver, a controller, etc. The circuit part 3000 may further include a power supply, a memory, etc.

Although FIG. 17 illustrates that the light output part 1000 and the sensing part 2000 are included in the optical apparatus A1, the light output part 1000 and the sensing part 2000 may be included in different devices. Furthermore, the circuit part 3000 may be connected to the light output part 1000 or the sensing part 2000 through wireless communication rather than via wire. In addition, the components illustrated in FIG. 17 may be variously changed.

The optical sensing systems according to the above-described exemplary embodiments are applicable to any of various types of optical apparatuses. For example, the optical sensing system is applicable to a light detection and ranging (LiDAR) device. The LiDAR device may be a phase-shift type or time-of-flight (TOF) type device. The LiDAR device is applicable to autonomous vehicles, flying objects such as drones, mobile devices, small-sized walking means (e.g., a bicycle, a motorcycle, a stroller, a skateboard, etc.), robots, human/animal support means (e.g., a cane, a helmet, accessories, clothing, a watch, a bag, etc.), Internet-of-Things (IoT) devices/systems, security devices/systems, etc. Optical sensing systems and optical apparatuses including the same according to various exemplary embodiments are capable of obtaining three-dimensional (3D) information of a space or an object through scanning and are thus applicable to 3D image acquiring devices, 3D cameras, 3D sensors, depth sensors, etc. In addition, an optical sensing system and an optical apparatus including the same according to the present disclosure are applicable to any of various fields of optics and electronic devices for any of various purposes.

Figure 18:
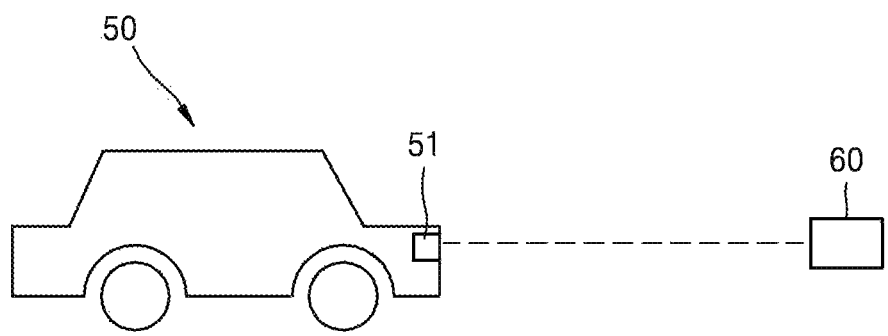
FIGS. 18 and 19 are conceptual diagrams illustrating a use of a light detection and ranging (LiDAR) device including an optical sensing system in a vehicle, according to an exemplary embodiment.
Figure 19:
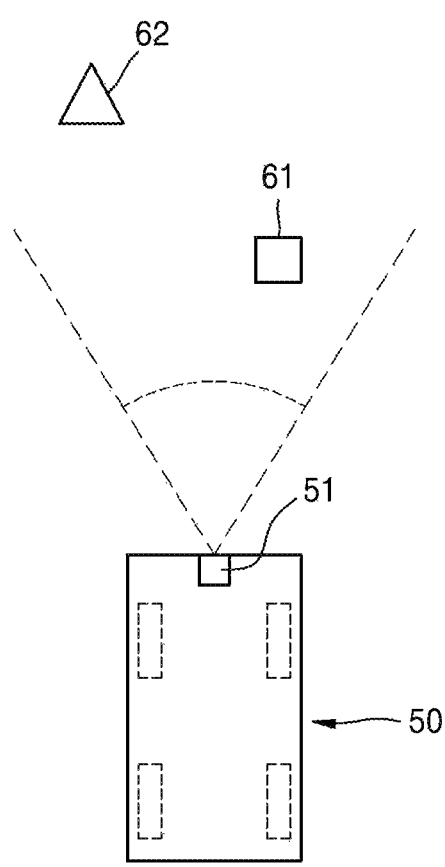

FIGS. 18 and 19 are conceptual diagrams illustrating a case of using a LiDAR device including an optical sensing system according to an exemplary embodiment in a vehicle. FIG. 18 is a side view. FIG. 19 is a top view.

Referring to FIG. 18, a LiDAR device 51 is applicable to a vehicle 50, and information regarding an object 60 may be obtained using the LiDAR device 51. The vehicle 50 may be a car having a self-driving function. An object or a human being, i.e., the object 60, which is located in a direction of movement of the vehicle 50 may be sensed using the LiDAR device 51. A distance to the object 60 may be measured using information such as a time difference between a transmission of a signal and the detection of the signal. Furthermore, as illustrated in FIG. 19, information regarding an object 61 which is within a scanning range and an object 62 which is beyond the scanning range may be obtained.

While many matters have been described in detail above, they are not intended to restrict the scope of the inventive concept and should be understood as merely exemplary. For example, it will be apparent to those of ordinary skill in the art that many changes may be made in the structures and arrangements of the active optical devices and the optical sensing systems including the same which are described with reference to FIGS. 1 to 14 above. As a concrete example, an optical property, e.g., a refractive index, of an active optical device may be changed according to any of various methods, e.g., a thermal method or a magnetic method, rather than an electrical method. An orientation of a laser beam passing through the active optical device may be controlled by changing a permittivity or a charge concentration (charge density) of the active optical device in units of unit regions, as well as changing the refractive index of the active optical device. The idea and exemplary embodiments of the inventive concept are also applicable to any of various types of light other than a laser beam.

Furthermore, optical sensing systems according to exemplary embodiments are applicable to any of various fields of optical apparatuses for any of various purposes. Accordingly, the scope of the inventive concept should be determined not by the exemplary embodiments set forth herein but by the technical idea defined in the appended claims.

What is claimed is:

1. An optical sensing system comprising:
a light output part configured to emit light; and
a sensing part configured to sense the light reflected from an object,
wherein the sensing part comprises:
a photodetector; and
an active optical device disposed on an optical path between the photodetector and the object,
wherein the active optical device is configured to control a direction of the light incident onto the active optical device, and comprises:
a refractive-index change layer having a refractive index which is changeable by application of an electrical signal; and
an electrode member configured to apply the electrical signal to the refractive-index change layer, and comprising a first electrode that is in contact with a first side of the refractive-index change layer, a plurality of second electrodes that are apart from each other and are in contact with a second side of the refractive-index change layer, and a plurality of thin-film transistors (TFTs) that are respectively electrically connected to the plurality of second electrodes,
wherein the first side and the second side of the refractive-index change layer are disposed to oppose each other in a direction perpendicular to a light incident surface of the refractive-index change layer, and
wherein the plurality of second electrodes are provided between the second side of the refractive-index change layer and the plurality of TFTs.

2. The optical sensing system of claim 1, wherein the light output part comprises a laser and the light emitted from the light output part comprises a laser beam.

3. The optical sensing system of claim 2, wherein the light output part comprises a beam steering device configured to steer the laser beam.

4. The optical sensing system of claim 1, wherein the refractive-index change layer comprises an electro-optic material.

5. The optical sensing system of claim 1, wherein the refractive-index change layer comprises at least one material selected from a group consisting of liquid crystal, potassium tantalate niobate (KTN), lead zirconate titanate (PZT), $LiNbO_3$, $LiTaO_3$ and $NbO_x$.

6. The optical sensing system of claim 1, wherein the first side of the refractive-index change layer is the light incident surface, and
wherein the second side of the refractive-index change layer is a light emission surface.

7. The optical sensing system of claim 1, wherein at least one of the first electrode and the plurality of second electrodes comprises an array of a plurality of electrode elements.

8. The optical sensing system of claim 1, wherein the refractive-index change layer comprises a plurality of unit regions, and
wherein the electrode member comprises a plurality of electrode elements respectively corresponding to the plurality of unit regions.

9. The optical sensing system of claim 1, wherein the active optical device comprises a plurality of unit regions, and
wherein the optical sensing system is configured to individually control an optical characteristic of each of the plurality of unit regions.

10. The optical sensing system of claim 1, wherein the active optical device has a size greater than a size of the photodetector.

11. The optical sensing system of claim 10, wherein the size of the active optical device is at least 1.5 times greater than the size of the photodetector.

12. The optical sensing system of claim 1, further comprising a lens system, having positive refractive power, disposed on an optical path between the active optical device and the object,
wherein the lens system is spaced apart from the active optical device.

13. The optical sensing system of claim 1, wherein the light output part is configured to simultaneously emit a plurality of laser beams.

14. The optical sensing system of claim 1, wherein the optical sensing system comprises a plurality of active optical devices, and
wherein the plurality of active optical devices are sequentially arranged on the optical path between the photodetector and the object.

15. The optical sensing system of claim 14, wherein the plurality of active optical devices comprise a first active optical device and a second active optical device, and
wherein the first active optical device comprises a first active layer, and the second active optical device comprises a second active layer.

16. The optical sensing system of claim 1, wherein the optical sensing system has a bi-axial structure.

17. An optical apparatus comprising the optical sensing system of claim 1.

18. The optical apparatus of claim 17, wherein the optical apparatus comprises at least one of:
a light detection and ranging device;
a three-dimensional (3D) image acquiring device;
a 3D sensor; and
a depth sensor.

19. An optical sensing system comprising:
a light output part configured to output light; and
a sensing part comprising:
    a photodetector; and
    a beam steering device comprising an active optical material layer having an optical property which changes upon application of an electrical signal to control a direction of the light incident onto the beam steering device,
wherein the beam steering device further comprises an electrode member configured to apply the electrical signal to the active optical material layer, and comprising a first electrode that is in contact with a first side of the active optical material layer; a plurality of second electrodes that are apart from each other and are in contact with a second side of the active optical material layer, and a plurality of thin-film transistors (TFTs) that are respectively electrically connected to the plurality of second electrodes, and
wherein the first side and the second side of the active optical material layer are disposed to oppose each other in a direction perpendicular to a light incident surface of the active optical material layer, and
wherein the plurality of second electrodes are provided between the second side of the active optical material layer and the plurality of TFTs.

* * * * *